March 10, 1942.    W. S. McFARLAND    2,275,636
TRAP
Filed April 9, 1941

Winfield S. McFarland, INVENTOR
BY Victor J. Evans & Co.
ATTORNEYS

Patented Mar. 10, 1942

2,275,636

UNITED STATES PATENT OFFICE 2,275,636

TRAP

Winfield S. McFarland, Culver, Ind.

Application April 9, 1941, Serial No. 387,750

3 Claims. (Cl. 43—90)

This invention relates to traps for small animals and more particularly to a third jaw or striker for preventing an animal from escaping by gnawing off a foot after it has been caught in the trap.

An object of the invention is to provide means for retarding the tripping of the third jaw until the animal is securely caught, movement of the trap by the trapped animal being relied upon to release the third jaw so that the possibility of the third jaw knocking the animal from the trap before the regular jaws firmly secure the animal is positively prevented.

A further object is to provide means for holding the third jaw clear of the regular jaws of the trap so that there is no additional pressure on the regular jaws except the pressure from the regular springs so that the trap may be tripped as easily as is customary.

A further object is to provide a third jaw having a chain secured to the regular anchoring chain, the first named chain having enough slack to let the third jaw trip when the animal moves the trap after the regular jaws have been sprung to trap the animal.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification.

Figure 1:
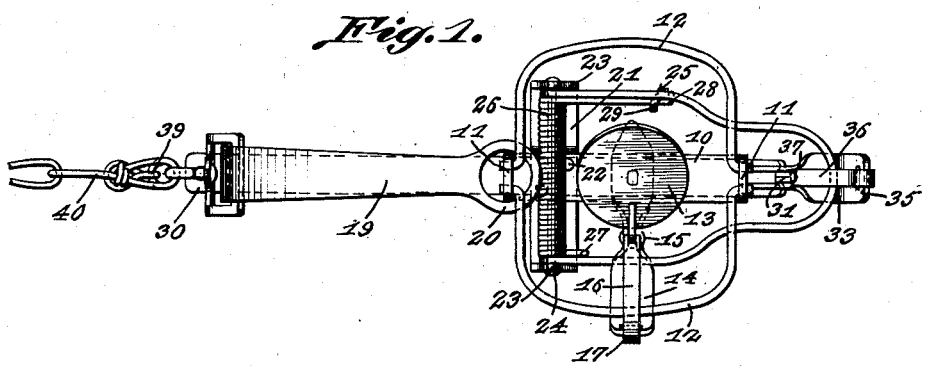
Figure 1 is a plan view of an animal trap constructed in accordance with the invention, the same being shown set.

Referring now to the drawing in which like characters of reference designate similar parts in the various views, 10 designates the base member of the trap, the same having upstanding apertured arms 11 which receive the ends of the regular jaws 12 in the usual manner. The jaws 12 are curved to form a circular space when the jaws are in their open position, which space accommodates the bait plate 13, which is pivotally connected to an upstanding lug which is rigidly connected to the intermediate portion of a transversely disposed base bar 14, as shown at 15. A trigger 16 is pivotally connected at the outer end, as shown at 17, to the upturned outer end of the base bar 14 and the free end of the trigger engages underneath a shoulder 18 on the bait plate. A main leaf spring 19 is provided at the ends with eyes 20, one of the eyes embracing the inner upstanding apertured arms 11 and the other moving up on the jaws 12 to close the jaws when the bait plate 13 is depressed to free the trigger from engagement with the upper edge of one of the jaws when the trap is set. The construction thus far described is well known in the art and its operation is well understood so that no further description is necessary.

Figure 2:
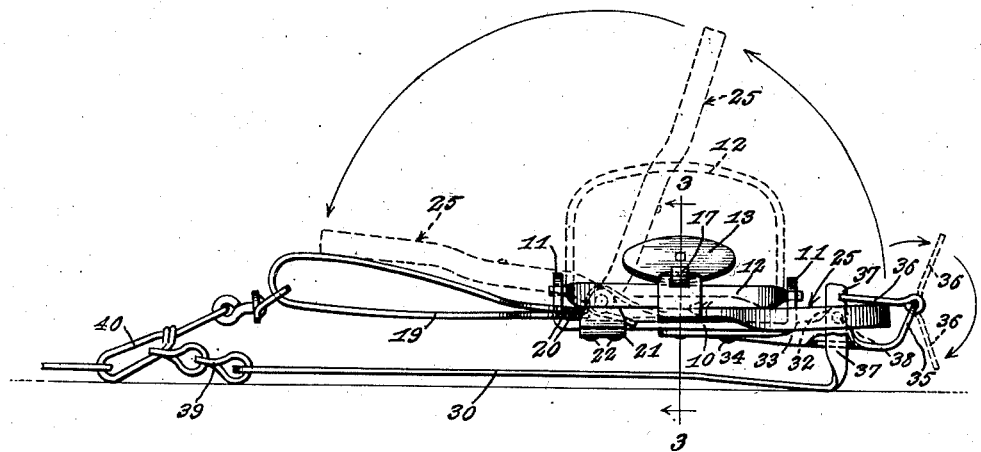
Figure 2 is a side elevation of the trap shown in Figure 1 and showing the movement of the third jaw by dotted lines and arrows.
Figure 3:
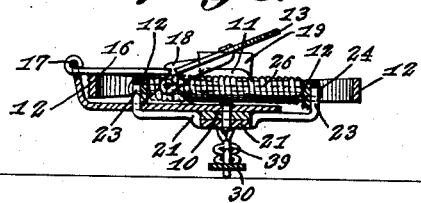
Figure 3 is a cross sectional view taken on the line 3—3 of Figure 2.

In accordance with the present invention, a transversely disposed bar 21 is riveted, as shown at 22 in Figure 1, or otherwise secured to the longitudinal base bar 10 of the trap. The bar 21 projects laterally beyond both sides of the base bar and is provided with upturned ends 23, best shown in Figure 3. A pivot pin 24 is passed through the upturned ends 23. The legs of a striker or third jaw 25 are apertured to pivotally receive the pivot pin 24. The jaw is in the form of a loop of sufficient length to extend beyond the regular jaws 12 of the trap when the third jaw is in set position. A helical spring 26 is sleeved on the pivot pin 24 between the legs of the third jaw and one end 27 of the spring bars upon the transversely disposed bar 21. The other end 28 of the spring is engaged underneath a laterally directed finger 29 on one of the legs of the third jaw. When the third jaw is rocked to the horizontal or set position, the spring is compressed to forcibly rock the third jaw rearwardly along the main base spring 19 of the trap, as shown best in Figure 2, to secure an animal to the trap after the main jaws 12 have been closed to trap the animal.

There is a lag between the operation of the main jaws 12 and the third jaw 25. This lag permits of the animal being securely held by the main jaws before the third jaw is operated so that the third jaw cannot dislodge the animal before it is securely trapped. To accomplish this, an elongated trigger 30, formed of strap metal, extends longitudinally of the bottom of the trap below the base member 10 of the trap and has one of its ends 31 upturned and pivoted between lugs 32, which rise from a bar 33 which is riveted, as shown at 34, to the base member 10. The bar 33 is provided with an upturned front end 35, to the upper end of which is pivoted a detent 36 adapted to engage underneath a shoulder 37 formed in the front edge of the upturned end 31 of the trigger above the pivot 38 of the trigger 30. The main portion of the trigger 30 extends parallel to the base member 10 of the trap and is connected at the rear end by a short chain 39 to the anchor chain 40 of the trap.

In operation, after the regular or main jaws 12 have been tripped and have closed upon the animal, the animal of course invariably lunges to free itself from the trap. When this takes place, the trap will be moved considerably so that the main trigger 31 will rock on its pivot 38 to the limit determined by the slack in the short chain 39 and dislodge the detent 36 from underneath the shoulder 37 in the upturned end 31 of the trigger. The detent, which has in the meantime been holding the third jaw in the horizontal or set position by engagement over the upper edge of the jaw, frees the third jaw to be instantly moved by its controlling spring 26 to strike the animal and secure it close to the trap so that it may not free itself by gnawing off a leg even if the animal is not killed outright from the force of the blow by the third jaw.

From the above description it is thought that the construction and operation of the invention will be fully understood without further explanation.

What is claimed is:

1. In a three jaw trap, a base, an extension on the base, means for delaying action of the third jaw until the other two jaws have closed comprising an elongated trigger having an end upturned, lugs formed on said extension of the base of the trap between which said upturned end is pivoted, the main portion of the trigger extending underneath and parallel to the base of the trap, means connected to the trigger and to the trap for limiting pivotal movement of the trigger, and a detent pivotally connected to the extension of the base of the trap and engageable over said third jaw, a shoulder on said upturned end of the trigger underneath which said detent is engageable to hold the third jaw open, movement of the trap by a lunge of a trapped animal after the main jaws have closed permitting the elongated trigger to gravitate relatively to the trap and release the detent for permitting the third jaw to close.

2. The structure as recited in claim 1 and in which said means comprises a short flexible member secured to the trigger and to the anchor chain of the trap.

3. In an animal trap, the combination with a pair of cooperating spring actuated main jaws and a third animal body engaging spring actuating jaw adapted to be set beneath the main jaws when the latter are set, means for controlling said third jaw to close after the main jaws have closed comprising a base for the trap, an extension on the base, an elongated trigger, a lug on the extension of the base of the trap, said trigger having an upturned end pivotally connected to the lug, the main portion of said trigger extending beneath and longitudinally of the bottom of the trap, a detent pivotally connected to the extension of the base of the trap and engageable over the third jaw, a shoulder on said upturned end beneath which said detent is engaged to hold the third jaw releasably set, and a short chain attached to the main portion of the trigger and to the trap for limiting outward movement of the trigger relative to the trap to dislodge the detent from the shoulder and permit the third jaw to close.

WINFIELD S. McFARLAND.